March 4, 1969     A. QUENOT     3,430,348
LINEAR MEASURING INSTRUMENTS
Filed Dec. 16, 1966
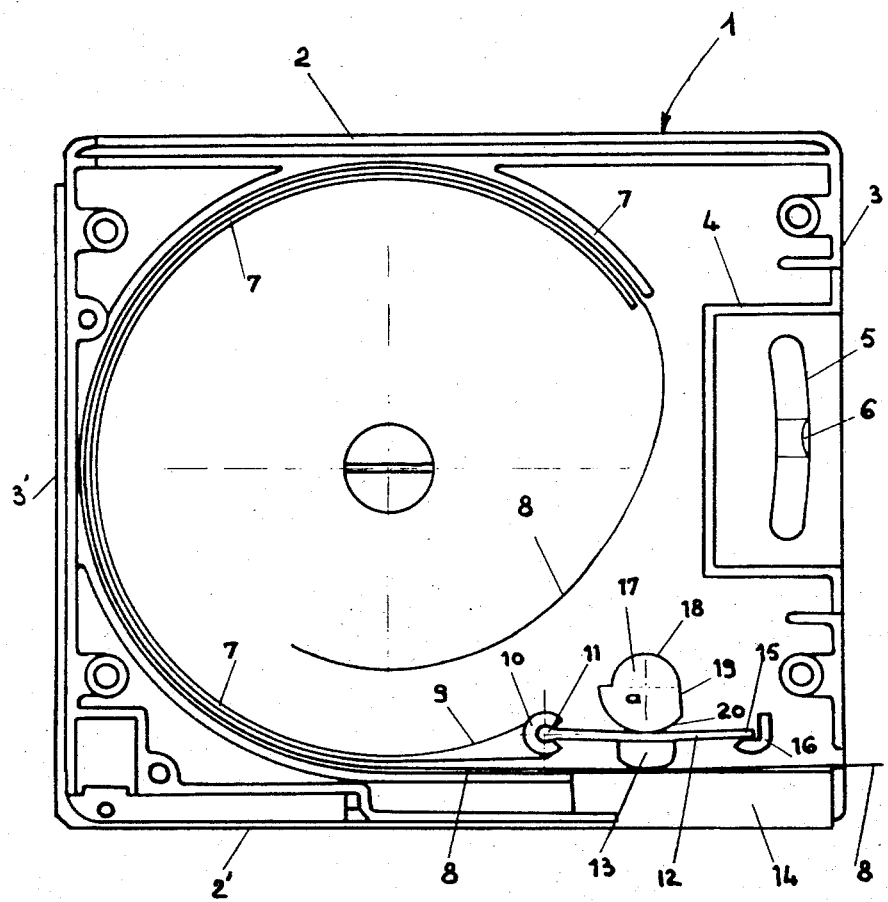

United States Patent Office 3,430,348
Patented Mar. 4, 1969

3,430,348
LINEAR MEASURING INSTRUMENTS
Andre Quenot, Besancon, France, assignor to Quenot & Cie S.a.r.l., Besancon, Doubs, France
Filed Dec. 16, 1966, Ser. No. 602,235
Claims priority, application France, May 27, 1966, 63,260
U.S. Cl. 33—138                                      6 Claims
Int. Cl. G01b 3/10

ABSTRACT OF THE DISCLOSURE

A tape measure having a level and in which a movable member mounted inside the casing in the vicinity of the outlet wedges the tape against a backing member for locking the tape with respect to the casing, there being a cam mounted in the casing to urge the movable member into its locking position and a leaf spring for urging the movable member into its unlocking position.

---

Linear measuring instruments are known which comprise a tape rolled at the interior of the case with a system for locking the tape. The locking of the tape is obtained, in the most part of cases, by the intermediary of an eccentric cam which bears directly on the tape, exerting thus a compression in the direction of exit or of reentry of the tape. The result is that in the course of use, an unconsidered movement of the user, or simply the fact of bearing the end of the tape against the object to be measured, can communicate to the cam a force in the direction of unlocking; inversely the component directed in the direction of the tape, of the force communicated by the eccentric cam can cause a displacement of the tape during locking so that the immobility of the tape is in no case guaranteed, and certain measuring errors can result.

Also known are linear tape measures which comprise a level incorporated in the storage case. Nevertheless, in all the existing cases, the level is parallel to the tape and can only serve to try to verify in the course of a measurement that the tape is horizontal, but can in no case permit to verify that it is vertical. In this case, its role is limited, for in general, the tape in the horizontal direction always bears against the material to be measured, or for a horizontal measurement in the air, the tape bends under its own weight when enough of its length lies outside the casing.

Consequently, the invention proposes to remedy these inconveniences and to furnish a linear tape measure with a system of locking which is foolproof in operation, shock resistant and not susceptible to be unlocked by forces acting on the tape. Moreover, the invention proposes to furnish tape measures which permit the verticalness to be controlled during measurements.

To this end, the invention concerns a linear tape measure comprising a measuring tape rolled at the interior of the case as well as means for locking the tape, characterised in that the means for locking the tape act appreciably perpendicularly to the plane of the said tape by the intermediary of a cam.

The invention will be better understood by referring to the following description made by way of nonlimiting example and to the annexed drawing in which the single figure is a plan view of an open case according to the invention.

The case 1, of rectangular shape, has its sides 2' and 3' rigorously perpendicular. The side 3 comprises a rectangular notch 4 in which the level 5 is of transparent material, in order that the bubble 6 be visible from all sides.

The case 1 comprises an inwardly directed guiding groove 7 for the tape 8 whose rolled up part is not shown.

The end 9 of the guiding groove comprises a circular housing 10 in which the cylindrical end 11 of the spring blade 12 is pivotably fitted. The spring blade 12 carries a boss 13 which acts on the tape 8 to wedge it against the side 14 of the case.

The end 15 of the leaf spring is stopped against a lug 16 of the case. In the unlocked position, the leaf spring 12 is in contact with the cam 17 on its circular part 18 of small radius. The boss 13 does not touch the side 14 of the case and the tape 8 is free to be displaced. By turning the cam 17 around its axis, the rising ramp 19 acts on the leaf spring 12 which deforms so that its boss 13 wedges the tape 8 against the part 14 of the case. To maintain the assembly locked, it is necessary that the circular part of large radius 20, which follows the ramp 19 of the cam 17, be in contact with the leaf spring 12. Thus the locking of the tape is achieved perpendicularly to its plane.

In another embodiment (not shown), the locking is effected by the intermediary of a device of approximately square shape, sliding in the vertical direction, normally spaced from the surface of the tape by the action of a small spring, and pressed in case of need against the tape by the action of an eccentric cam.

In another embodiment (not shown), the locking can be obtained by a device in the form of a case sliding in the vertical direction and normally spaced from the tape by the action of the eccentric cam acting at the interior of the case, or pressed against the tape by this same action of the eccentric cam.

Although the invention has been described with respect to a particular embodiment, it is understood that it is not limited to that embodiment, and that various modifications of shape, detail and material can be made without departing from the scope and the spirit of the invention.

What is claimed is:

1. Tape measure comprising a casing having an outlet, a measuring tape coilable inside the casing, and manually withdrawable from the casing through said outlet, the casing being provided with a backing member fixed inside the casing in the vicinity of said outlet, a movable member mounted inside the casing in the vicinity of said outlet facing the backing member, the tape passing between the backing member and the movable member during withdrawal or rewinding of the tape, the movable member being adapted to move substantially perpendicularly to the tape between a locking position in which the movable member engages the tape and wedges the tape against the backing member thereby locking the tape with respect to the casing, and an unlocking position in which the movable member does not engage the tape, and a cam mounted in the casing adapted to urge the movable member into its locking position, a leaf spring for urging the movable member into its unlocking position, said movable member comprising a boss mounted on said spring, one end of said spring being pivotally mounted in said casing; said casing supporting the other end of said spring, said cam being adapted to bear directly against said spring.

2. A tape measure according to claim 1, in which a level is mounted perpendicular to the plane of withdrawal of said tape from said casing.

3. A tape measure according to claim 1, wherein said casing is rectangular in shape with a first side adjacent to and parallel to the plane of withdrawal of said tape, a second side perpendicular to the first side, said second side being provided with said outlet and wtih a level, and a third side opposed to said second side, said third side being perpendicular to said first side.

4. A tape measure according to claim 2, wherein said level is mounted in transparent material and is visible from all sides.

5. A tape measure according to claim 2, wherein said casing has an inwardly directed guiding groove for said tape, said groove terminating in an enlarged section, said section having a circular opening, said spring having a cylindrical end pivoted in said opening, a lug mounted in said casing supporting the other end of said leaf spring.

6. A tape measure according to claim 5, having a level mounted perpendicular to the plane of withdrawal of said tape.

References Cited

UNITED STATES PATENTS

| | | | |
|---|---|---|---|
| 2,108,251 | 2/1938 | Clark | 33—141 |
| 2,575,354 | 11/1951 | Mills | 33—189 |
| 2,906,024 | 9/1959 | Smith. | |
| 3,021,599 | 2/1962 | Odom | 33—46 |
| 2,813,349 | 11/1957 | Harris | 33—211 |

LEONARD FORMAN, *Primary Examiner.*

STEVEN L. STEPHAN, *Assistant Examiner.*

U.S. Cl. X.R.

33—207; 242—107.3